Jan. 7, 1941.  F. H. GULLIKSEN  2,228,078
REVERSING CONTROL FOR ALTERNATING-CURRENT MOTORS
Filed Oct. 27, 1938  2 Sheets-Sheet 1
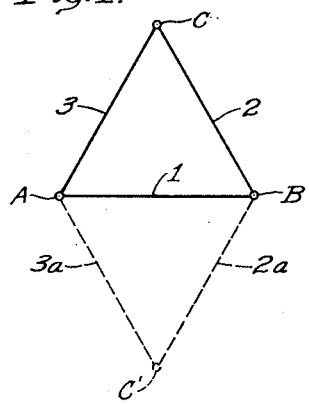
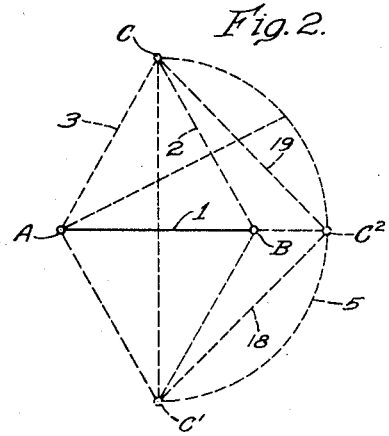
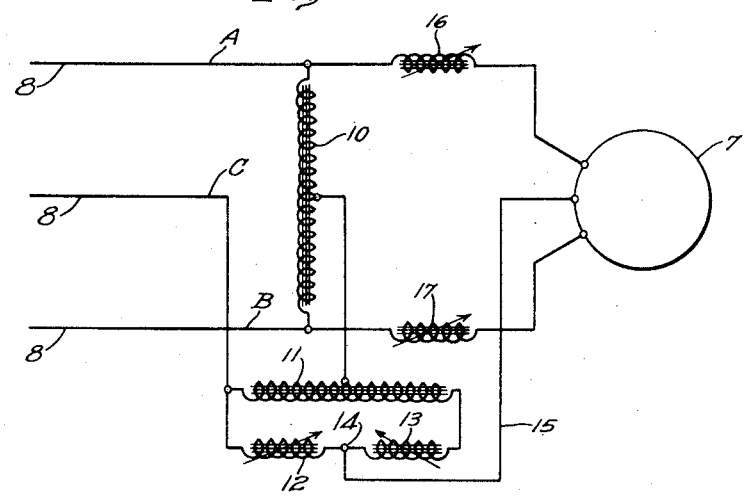
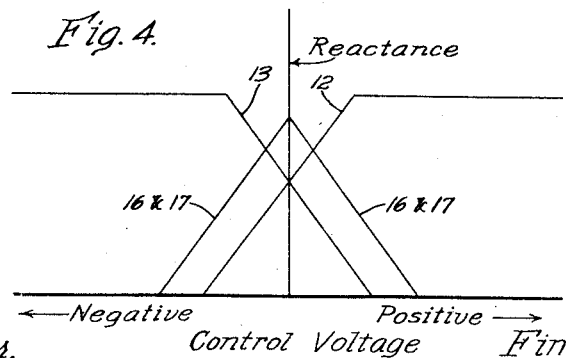
WITNESSES:  INVENTOR
C. J. Weller.  Finn H. Gulliksen.
J. E. Foster.  BY Paul E. Friedemann
  ATTORNEY Jan. 7, 1941.  F. H. GULLIKSEN  2,228,078
REVERSING CONTROL FOR ALTERNATING-CURRENT MOTORS
Filed Oct. 27, 1938   2 Sheets—Sheet 2
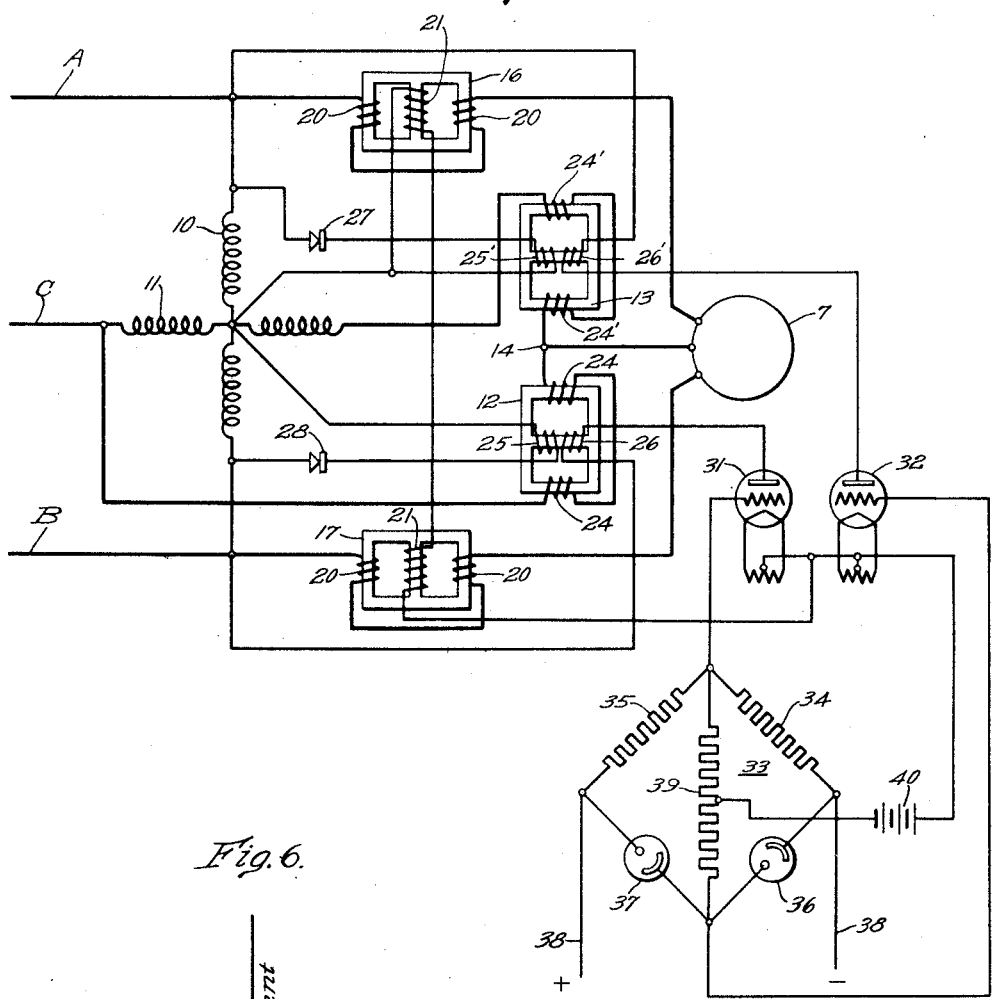
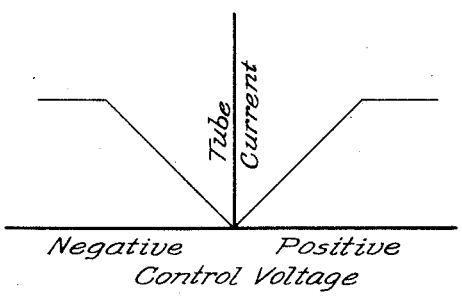
WITNESSES:
INVENTOR
Finn H. Gulliksen.
BY
Paul E. Friedemann
ATTORNEY Patented Jan. 7, 1941

2,228,078

UNITED STATES PATENT OFFICE 2,228,078

REVERSING CONTROL FOR ALTERNATING-CURRENT MOTORS

Finn H. Gulliksen, Pittsburgh, Pa., assignor to Westinghouse Electric & Manufacturing Company, East Pittsburgh, Pa., a corporation of Pennsylvania Application October 27, 1938, Serial No. 237,267

13 Claims. (Cl. 172—179)

This invention relates to control systems for alternating-current motors.

One object of my invention is to provide a system for reversing the direction of rotation of an alternating-current motor electrically, with stationary equipment and without opening the circuit between the motor and its source of energy.

Another object of my invention is to provide a control system by means of which an alternating-current motor may be easily and quickly reversed from a maximum speed in one direction to a maximum speed in the opposite direction, with gradual deceleration from maximum speed in either direction to zero speed and subsequent acceleration from zero speed to maximum speed in the opposite direction, without opening the circuit between the motor and its source of energy.

In many applications it is desirable to establish a reversal in the direction of rotation of a motor in order to properly control the movement, or the position, of a driven machine, or of certain driven parts of the machine. Where such reversal of the motor is employed for regulating purposes, relatively fast operation of the motor is particularly desirable. One particular application, where such reversing operation of a motor is employed, is in a slitting machine, where registration must be maintained between the slitter knives of the slitting machine and a roll of material that is fed to the machine to be slitted or cut into strips or ribbons by those knives. If the material, that is to be slitted, deviates from its proper path, the reversible control motor shifts the material to reestablish the desired registration between the material and the knives. Since the deviation might be in either direction, the motor must necessarily be reversible to correct for deviation in either direction, in order to maintain the desired and necessary registration. Such a system generally is illustrated in my recent application Serial No. 212,521, patented July 16, 1940, No. 2,208,420 and assigned to the assignee of this application.

In such prior application, a direct-current motor was employed to maintain such registration because of the general ease and simplicity of reversing a direct-current motor by reversing either the field or the armature current. In order to obviate the delay that would be introduced by the operation of mechanical switching equipment the energization of the direct-current motor has been procured from an alternating-current source, and has been controlled by means of thermo-electric valves to selectively transmit either the positive waves or the negative waves, from the alternating-current circuit, to supply energy of proper polarity to the armature to establish the desired direction of rotation of the motor.

One limitation that was imposed upon that system is the maximum current conducting capacity of the thermionic valves employed to control the motor. For example, the maximum current capacity of such valves, commercially known as thyratron tubes, has been of the order of six amperes. Consequently, the size of the motor that could be directly controlled by those valves was limited to about one horsepower.

A further limitation of that system is that the selective character of the valves permits only the positive waves, or only the negative waves, to be transmitted to the motor, according to which valve is operative to energize the motor for the temporary adjustment that was necessary to correct the deviation. The available energy of the unused current waves is therefore not available for use in the motor, and the full capacity of the motor could not be utilized.

A further limitation is that a certain element of delay is introduced by the loss of the time during which the unused current waves were not transmittted for utilization.

Another object of my invention, therefore, is to provide a system in which an alternating-current motor may be employed with means for reversing the direction of rotation of the motor with a minimum loss of time, and with a possible utilization of the circuit energy available for the motor from the waves of both polarities.

Another object of my invention is to provide a system, of the foregoing character, in which the type of control shall be such as to permit the employment and the control of a motor of relatively large horsepower.

In order to control the reversal of the rotation of the motor, I provide a control system by which the direction of phase rotation of the voltages applied to the motor may be reversed. To accomplish that reversal, I employ a phase-shifting circuit between the supply circuit and the motor.

Considered in its most fundamental aspect, the control system reverses the direction of phase rotation of the circuit voltages that make up the voltage triangle for application to the motor, by shifting the voltage of the apex of the triangle, from a positive position with respect to the base of the voltage triangle to a correspondingly negative position relative to the base of the voltage triangle. Such shifting of the voltage is accomplished by making the apex voltage, of the voltage triangle, a point of variable potential in a phase-shifting circuit, and in then changing the constants of that circuit to shift the phase position of that point of variable potential from a positive position with respect to the base line voltage of the voltage triangle, to a negative position with respect to the base line voltage of the voltage triangle.

A simple circuit arrangement in which the reversal of an alternating-current motor is established, in accordance with the principles of my invention, is shown in the accompanying drawings, in which:

Figure 1 is a graph illustrating the relative location of the voltages of a system to establish phase rotation in a normal direction, or to establish phase rotation in a reverse direction;

Fig. 2 is a graph illustrating the manner in which a voltage triangle may be modified, by a superimposed phase-shifting system which may vary the relationship between the phase voltages, to establish a gradual variation in the relationship between the voltages, from normal balanced relation in one direction of phase rotation to a normal balanced relation in the opposite direction of phase rotation;

Fig. 3 is a diagram of a simple fundamental circuit showing the elements of a control system according to my invention;

Fig. 4 is a graph showing the required relationship between the various elements of the fundamental system of Fig. 3 to achieve the desired operation;

Fig. 5 is a complete circuit diagram of the system including the fundamental units illustrated in the diagram of Fig. 3, and arranged to be controlled to have the required characteristics illustrated in the graph of Fig. 4; and Fig. 6 is a simple graph illustrating the relationship between selective control voltages that control the establishment of a desired direction of rotation, and the control currents established by and through the control rectifier tubes of the complete circuit of Fig. 5.

As illustrated in Fig. 1, the voltages of a three-phase system, for example, may be illustrated, respectively, by three vectors 1, 2 and 3 forming a closed equilateral triangle. The sides of the triangle represent the voltages between the phase conductors A, B and C shown at the vertices of the triangle. In the triangle A—B—C shown in solid line, the phase rotation may be considered as being A—B—C.

If now the triangle A—B—C can be reversed around the voltage A—B as a base line, to form the triangle A—B—C' shown in broken lines, the phase rotation will be reversed. Thus, if the voltages between the three conductors of a circuit A, B and C, and a motor, can be shifted to change the relationship of the voltages of one conductor, such as C, with respect to the voltage between the other phase conductors A and B, as indicated in Figs. 1 and 3, the phase rotation can be reversed, and, by such reversal of phase rotation, the direction of rotation of a motor energized by such voltages can be reversed.

In Fig. 2, I have illustrated the manner in which the angular relationship of the potential point C, of the voltage system A—B—C, may be shifted from a position above the voltage line A—B to a position below that voltage line. The base voltage of line A—B and the voltages represented by the lines B—C and C—A represent the normal three-phase voltages and the normal direction of rotation. When the voltage point C is shifted to the position C', below the base line A—B of the triangle, to establish a correspondingly symmetrical triangle below the line A—B, the line C—C' indicates or represents an auxiliary voltage which must be established to be available to serve as the diameter of the semi-circular locus of the path of the potential point C in its movement from position C, above base line A—B, to position C', below base line A—B. That means that the voltage C—C' of the phase-shifting circuit will be utilized as the diameter of the circular locus to be established by the voltage control circuit for controlling the potential of the point C between the two limit positions C and C'.

It thus becomes clear that if the position of the voltage point C can be shifted, by a phase-shifting circuit, from its normal position C to its arbitrary position C', the phase rotation of the voltages making up the voltage triangle A—B—C can be reversed, by changing the constants of the phase-shifting circuit that controls the potential of the point C.

In Fig. 3, I have illustrated a simple diagram of a control circuit for an alternating-current motor 7, which, in this case, for the sake of simplicity, may be considered a three-phase motor. Energy for the motor is derived from a three-phase circuit 8, and the three conductors are respectively identified as the phases A, B and C. A highly reactive impedance 10 is connected between conductors A and B. A highly reactive impedance 11 is connected as an auto-transformer between conductor C and the midpoint of the impedance 10. The midpoint of impedance 10 is connected to the midpoint of impedance 11 as shown. Two variable impedances 12 and 13 are connected in series across the auto-transformer impedance 11, and the midpoint or juncture 14 between the impedances 12 and 13 is connected through a conductor 15 to the motor 7. Two other variable impedances 16 and 17 are respectively connected in the circuits of the conductors A and B to the motor 7 between the impedance 10 and the motor.

The potential of the midpoint 14 is the point of variable potential which may be varied from position C at one end of its path, to position C' at the other end of its path on the semi-circle 5 of Fig. 2. The potential of that point will be varied and controlled according to the variation in the relationship between the impedance values of the impedances 12 and 13.

Upon considering Fig. 3 with relation to Fig. 2, the operation of the system will be apparent. The juncture, or midpoint, 14 is the variable voltage point in the phase-shifting system of Fig. 2. If the impedance value of the impedance 12 is made zero while the impedance value of the impedance 13 is made a maximum, the impedance 12 will in effect be short circuited and the potential of the point 14 will correspond to the potential of the conductor C connected to the auto-transformer impedance 11. Under those conditions, the phase rotation of the system will be A—B—C, corresponding to the voltage arrangement of the upper triangle in Fig. 2.

If the variation of the impedances 12 and 13 is now reversed, so that the impedance value of 13 is zero while the value of impedance 12 is made a maximum, the potential of the point 14 will be shifted to a position corresponding to C' in Fig. 2, and the voltages impressed upon the motor 7 will have the phase rotation of the lower triangle A—B—C' in Fig. 2. The direction of rotation of the motor will thereupon be reversed.

It will be obvious, upon referring to Fig. 2, that as the impedances 12 and 13 are varied, the potential of the point 14 will shift along the semi-circle 5, which is the locus of the path of the potential of point 14. When the impedance values of the two impedance devices 12 and 13 are equal, the potential of point 14 will be such as to be located at point C—2, directly in phase with the voltage A—B. Under such conditions, the voltage impressed upon the motor 7 will be substantially a single-phase voltage, with no tendency to rotate the motor, and the motor will not rotate.

Under such conditions of single phase energization, the motor would become quickly overheated unless the current to the motor were limited, or unless the motor were not permitted to remain at standstill for a considerable period of time.

In order to prevent excessive currents while the motor is so energized at standstill, the impedance devices 16 and 17 are provided in the motor circuit with suitable arrangements to control the values of the impedances 16 and 17 according to the operating condition of the motor, to control the circuit currents.

We may now refer to Fig. 4 which shows, graphically, the relationship between the various reactive impedances during the operation of control. For convenience, the horizontal, or abscissa, base line represents the external control voltages or impulses that indicate or select the desired rotation of the motor. The vertical ordinate base line represents the impedance values of the respective impedance devices.

Since the vertical zero base line corresponds to a zero speed condition at which the motor is not to rotate, the motor current should be a minimum, and the impedance devices 16 and 17 should be at their maximum values, at that time, as represented by the lines 16 and 17 reaching the ordinate base line at the maximum values of those impedances. The impedance values of the impedance devices 12 and 13 would be equal at that time, as is clear from reference to Fig. 2, which shows that the potential of the point 14, as represented by the point C—2, is midway between the point C and the point C', so that the chords 18 and 19, representing the impedance values, would be equal.

When the motor is to be rotated in one direction, for example in the positive direction, corresponding to the right-hand side of the chart of Fig. 4, and starting gradually from rest, the impedance device 13 will be gradually diminished to zero, and both impedances 16 and 17 will be gradually diminished to zero, while the impedance 12 will be gradually increased to its maximum value. During such operation, the potential of the point 14 will be shifted to either extreme position C or C', depending upon the direction of rotation which the positive control voltage is to establish.

Conversely, when the reverse direction of operation is to be established, the impedance value of impedance 12 will be gradually diminished from its maximum value to the point where it crosses the vertical ordinate base, and the motor will be simultaneously gradually decelerated to standstill. At the same time, as Fig. 4 shows, the impedance values of the impedances 16 and 17 will be gradually increased as the motor speed is diminished, in order to limit the current through the motor windings while it is not rotating.

As the impedance value of the impedance device 12 is continuously diminished beyond the ordinate base line, to establish a reverse phase rotation and rotation of the motor in the reverse direction, the impedance values of the series impedances 16 and 17 will also be gradually diminished, and the impedance value of the impedance 13 will be increased to its maximum value.

In that manner, by gradually oppositely varying the impedance values of the impedance devices 12 and 13, the direction of phase rotation of the voltages applied to the motor, and, consequently, the direction of rotation of the motor, will be gradually reversed. At the same time, the values of the series impedances 16 and 17 should be varied to prevent excessive currents from flowing to the motor while the motor speed is being reduced.

In Fig. 5, I have illustrated the manner in which the impedance values of the several impedances may be automatically varied. Each of the impedances, for illustration, is shown as being of the three-leg reactor type, in which two windings on the outer legs of the core are energized by the alternating current, and one winding, or more, on the middle leg is energized with direct current to control the flux condition of the core, and thereby to control the impedance of the reactor.

As shown in Fig. 5, each impedance 16 and 17 is provided with two alternating-current windings 20 on the outer legs, and with one direct-current winding 21 on the middle leg. The impedances 12 and 13 are provided with two alternating-current windings 24 and 24' on the respective outer legs, and two direct-current windings 25 and 26, and 25' and 26' on the respective middle legs.

The direct-current windings of the several impedances, when energized by direct current, establish a flux to diminish the reactive impedance values of the associated impedance devices, and, thus, are utilized to control the impedance values of those devices.

The direct-current windings 25 and 25' of the two impedances 12 and 13, of the phase shifting circuit, are respectively energized with direct current derived from the main circuit through rectifying devices 27 and 28, respectively. Each associated direct-current winding 26 and 26' of the impedances 12 and 13, is arranged to be differentially effective with respect to the windings 25 and 25', and thus each winding 26 and 26' serves as the control winding for the respective impedance devices 12 and 13. Those control windings 26 and 26' are respectively energized through two gaseous type grid control thermionic tubes 31 and 32, which are controlled, in turn, to be selectively conductive, by means of a control bridge 33.

The control bridge is briefly illustrated as consisting of a Wheatstone bridge arrangement of two resistors 34 and 35, a pair of photo-cell control devices 36 and 37, and a source of control energy 38. In order to provide an initial blocking bias on the two control tubes 31 and 32, a biasing resistor 39 is provided between two points of the bridge 33, and the midpoint of the resistor 39 connected through a source 40 of biasing voltage to the cathodes of control tubes 31 and 32.

In the system which I have previously mentioned, namely, the slitter control system in which the reversing operation of the motor is desired, the two photo-cells that are usually employed to check the position of the material and to detect any deviation, correspond to the two photo-cells 36 and 37 shown in Fig. 5 as operating to control the bridge 33, to selectively control the polarity of the control grids of the selector tubes 31 and 32.

Thus, if the bridge is unbalanced in one direction by one photo-cell because of a deviation of the material to be controlled, detected, for example, by deviation of a guide line on the material that is to be controlled, the bridge will be unbalanced to energize one tube which will then selectively control the system to operate the motor in the proper direction to restore the guide line to its proper position or path.

Under converse conditions, if the deviation is in the opposite direction, the bridge will be unbalanced in the opposite direction to energize the other control tube, which will serve to control the system to reverse the phase rotation of the voltages to the motor, to establish rotation of the motor in the opposite direction.

Under normal conditions, when proper alignment exists between the material carrying the guide line and the slitter knives, the bridge will be balanced, and neither grid controlled tube 31 nor 32 will be energized. Under such conditions, the motor will not be energized to rotate and will be stationary.

It will be clear from Fig. 5 that only one of the grid controlled tubes will be operative, at any one time, to control the system to govern the direction of rotation of the motor. Normally, the grids of both tubes are provided with a slight negative bias to prevent conduction, and each tube is rendered conductive only when the bridge becomes unbalanced and according to the direction of unbalance. The unbalanced voltage of the bridge is sufficient to overcome the negative bias and to energize the tube to render it conductive.

When the motor is not to rotate, as, for example, when external conditions are balanced or normal, the reactive impedances 16 and 17 should be high. Their flux control windings 21 will therefore not be energized at that time, so that the maximum impedance values will be available to limit the current through the motor.

The impedances 12 and 13 will have their constant direct flux windings 25 and 25' energized through the rectifiers 27 and 28. The fluxes developed by those windings will be at a maximum when the selective grid controlled tubes 31 and 32 are not operative. The flux field winding 25' of impedance 13 is connected between conductor A and the midpoint of impedance 10, through the rectifier 27. The corresponding winding 25 of the impedance 12 is connected between the conductor B and the midpoint of impedance 10, through the rectifier 28. The rectifiers 27 and 28 will be alternately effective to transmit current to their respective associated windings according to the polarity of the conductors to which the rectifiers are connected.

During standstill conditions, the two impedance devices 12 and 13 will, therefore, be alternately affected by enlarging and diminishing direct-current fluxes. Since alternations in the fluxes will take place during immediately successive waves or half cycles, the effective result so far as the motor is concerned will be that the potential of the mid-point 14 between the two impedances 12 and 13 will be substantially stationary at a position corresponding to the point C—2 in Fig. 2.

Upon the occurrence of conditions that render one of the tubes, such as tube 31, conductive, tube 31 will transmit current that will energize the winding 26 of impedance 12. Since the winding 26 is oppositely effective relative to the winding 25, the direct-current flux will be entirely eliminated when the current through tube 31 is maximum. Under such conditions, the impedance value of the impedance 12 will be a maximum and the impedance value of the impedance 13 will be a minimum, since the impedance 13 will be still energized by its direct-current flux through winding 25', and its associated winding 26' will be deenergized. The potential of the midpoint 14 will therefore be in its upper position, approximately at the position indicated by point C in Fig. 2. During such conditions, the motor 7 will rotate in the direction which may be considered the forward direction of the motor. Such rotation in that direction would continue so long as the tube 31 was energized.

If the tube 31 is controlled by a control device, such as the Wheatstone bridge, to be maintained energized so long as an improper condition continues to exist and is effective to establish the unbalance in the bridge, the motor will correspondingly continue operating during that time to correct the improper condition.

When conditions become normal and the bridge becomes rebalanced, tube 31 becomes non-conductive again at the end of the conducting half wave during which the bridge became balanced, to permit the reestablishment of the negative bias on the grid of the tube 31. Under such conditions, the motor speed would decelerate to zero.

If, now, the bridge should become unbalanced in the opposite direction, the other control tube 32 would become energized, and it would then energize the differential control winding 26' of the impedance device 13 to counteract and to eliminate the direct-current flux from the impedance device 13 and to increase the impedance value of that device. The potential of the midpoint 14 would then be shifted below the horizontal zero base line of Fig. 2, to a position at or in the neighborhood of the point indicated at C'. The voltages now impressed upon the motor would be in a relationship of reversed phase rotation and the motor would be rotated in a backward direction. Such operation would continue until tube 32 became non-conductive. Windings 25 and 25' of both impedances 12 and 13 would be fully effective and the impedances equal in value. The potential of point 14 would move back to point C—2 and the motor would decelerate to zero speed.

I have illustrated the bridge 33 with its photo-cell unbalancing tubes as one means whereby the tubes 31 and 32 could be selectively energized to automatically control the effective values of the impedance devices to establish the desired phase rotation and consequent direction of motor rotation. It will be understood, of course, that other circuit controlling devices, such as even simple switches, might be employed to selectively energize either control tube 31 or 32 according to the direction of rotation desired in the motor, depending upon the speed desired or that may be sufficient for the control function.

In order to control the impedance values of the current limiting impedances 16 and 17 according to the operation of the motor, the two direct-current flux-producing coils 21 and 21' of the two line impedance devices 16 and 17 are connected in series with the two control tubes 31 and 32, that are in parallel, so that the two windings 21 and 21' will be energized by the current traversing either of the tubes 31 and 32. Thus, when either control tube 31 or 32 is energized, the impedance values of impedances 16 and 17 will be diminished to a minimum.

By means of the arrangement illustrated, the voltages impressed upon a motor, as derived from an alternating-current circuit, may be made to correspond in phase rotation to the normal rotation of the supply circuit, or to a phase rotation that is the reverse of the phase rotation of the circuit, purely by electrical means and without opening the circuit between the supply source and the motor. By such action, immediate responsiveness of the motor may be procured, and no time lost in its energization and control, such as might be introduced by the time delay of switching devices that require mechanical operation.

Moreover, the current through the control tubes 31 and 32 is used merely to control the flux-producing windings of the impedance devices, and those flux-producing windings, through the impedance devices, may control motor currents that are greatly in excess of the current-carrying capacity of the tubes 31 and 32. Consequently, the motor capacity which can be controlled by the tubes, through the present system, is greatly in excess of the motor capacity which could heretofore be controlled directly by the tubes 31 and 32.

In Figure 6, I have shown a simple qualitative relationship between the selective control voltages that select and determine the direction in which the motor shall rotate, and the current through the control tube 31 or 32. The control voltage represents a control function rather than any particular voltage value, and the control function is achieved in any desired manner, being illustrated herein, as already mentioned, by the photo-cells 36 and 37, which are susceptible of selective response to a condition such as the deviation of a guide line on a sheet of controlled material.

When either photo-cell functions, it establishes the selective control voltage that governs the conductivity of the control tubes 31 and 32.

I have illustrated the application of this system to a three-phase circuit for energizing a three-phase motor. In view of the quadrature relationship between the primary impedance 10 and the auto-transformer 11, it will be obvious, particularly upon reference to Fig. 5, that the system may be adapted to a two-phase supply circuit by making the voltage connection of one phase available for the two variable impedances 12 and 13, to bear a relationship to the other voltage potential according to the relationship indicated in Fig. 2 between the line C—C' and the line A—B.

My invention is therefore not limited to any specific number of phases, nor to the specific details or arrangement of details illustrated, since the same may be variously modified so long as they accomplish the same result without departing from the spirit and scope of the invention as set forth in the appended claims.

I claim as my invention:

1. The combination with an alternating-current motor having polyphase windings and a source of energy therefor, variable inductance means connected in each conductor between the source and the motor including phase shifting means, and means for controlling the phase-shifting means to reverse the direction of motor energization without opening the circuit between the source and the motor.

2. The combination with an alternating-current motor having polyphase windings, and a source of energy therefor, of variable reactive means connected in each conductor between the source and the motor, and means for controlling the impedance of one of said reactive means to reverse the phase sequence and direction of motor rotation without opening the circuit between the source and the motor.

3. The combination with an alternating-current motor having polyphase windings, and a source of energy therefor, of an inductance device in each of a plurality of circuit conductors between the source and the motor, phase shifting means including a pair of variable impedance devices, and means for selectively controlling the impedance values of said pair of impedance devices to reverse the phase sequence of energization of the motor without opening the circuit between the source and the motor.

4. A system for reversing a three-phase motor without opening the circuit between the motor and its source of energy, comprising, in addition to the source and the motor, reactive impedance means in each conductor between the source and the motor, flux control winding means for each impedance means, including means for selectively energizing the flux-control winding means of the several impedance means.

5. A control system for controlling the direction of rotation of a three-phase motor energized from a three-phase source of energy, comprising a first impedance device for establishing a voltage providing two terminal potential points of two phases of the system, a second impedance device having its midpoint connected to the midpoint of the first impedance device, a third and a fourth impedance device connected in series across the terminals of the second impedance device, means connecting the three-phase terminals of the motor to the two terminals of the first impedance device as two phase points and to the juncture point between the third and the fourth impedance devices as the third phase point, and means for varying the impedance values of the third and the fourth impedance devices.

6. A control system for controlling the direction of rotation of a three-phase motor energized from a three-phase source of energy comprising a first impedance device for establishing a voltage providing two terminal potential points of two phases of the system, a second impedance device having its midpoint connected to the midpoint of the first impedance device, a third and a fourth impedance device connected in series across the terminals of the second impedance device, means connecting the three-phase terminals of the motor to the two terminals of the first impedance device as two phase points and to the juncture point between the third and the fourth impedance devices as the third phase point, means for varying the impedance values of the third and the fourth impedance devices, and means for simultaneously and oppositely varying the impedance values of the third and the fourth impedance devices from maximum to minimum values.

7. A control system for controlling the direction of rotation of a three-phase motor energized from a three-phase source of energy comprising a first impedance device for establishing a voltage providing two terminal potential points of two phases of the system, a second impedance device having its midpoint connected to the midpoint of the first impedance device, a third and a fourth impedance device connected in series across the terminals of the second impedance device, means connecting the three-phase terminals of the motor to the two terminals of the first impedance device as two phase points and to the juncture point between the third and the fourth impedance devices as the third phase point, means for varying the impedance values of the third and the fourth impedance devices, a flux-control winding on each of the third and the fourth impedance devices, a neutralizing flux winding for each of the third and the fourth impedance devices, and means for separately energizing the several flux-control and neutralizing windings.

8. A control system for controlling the direction of rotation of a three-phase motor energized from a three-phase source of energy comprising a first impedance device for establishing a voltage providing two terminal potential points of two phases of the system, a second impedance device having its midpoint connected to the midpoint of the first impedance device, a third and a fourth impedance device connected in series across the terminals of the second impedance device, means connecting the three-phase terminals of the motor to the two terminals of the first impedance device as two phase points and to the juncture point between the third and the fourth impedance devices as the third phase point, means for varying the impedance values of the third and the fourth impedance devices, a flux-control winding on each of the third and the fourth impedance devices, a neutralizing flux winding for each of the third and the fourth impedance devices, means for separately energizing the several flux-control and neutralizing windings, a fixed rectifier for each flux-control winding, and a variable rectifier for each neutralizing winding to control the flux and the impedance value of the impedance devices.

9. A control system for controlling the direction of rotation of a three-phase motor energized from a three-phase source of energy comprising a first impedance device for establishing a voltage providing two terminal potential points of two phases of the system, a second impedance device having its midpoint connected to the midpoint of the first impedance device, a third and a fourth impedance device connected in series across the terminals of the second impedance device, means connecting the three-phase terminals of the motor to the two terminals of the first impedance device as two phase points and to the juncture point between the third and the fourth impedance devices as the third phase point, means for varying the impedance values of the third and the fourth impedance devices, a series of impedance devices between the motor and the respective terminals of the first impedance device, and means for varying the impedance values of said series impedances while varying the third and the fourth impedances.

10. A motor control system for reversing an alternating-current motor without opening the circuit connections of the motor to its source, comprising a polyphase motor, a polyphase supply source therefor, impedance means connected across a pair of terminals of said source for setting up the base voltage of a voltage triangle and a network connected to the base voltage means and having impedance elements that may be varied to shift the potential of a point of the network to establish either of two voltage triangles of desired phase rotation, with the base voltage and the selected potential of said network point.

11. A motor control system for an alternating-current motor having polyphase windings comprising a network of reactors including a main reactor shunted by a pair of series connected saturable reactors which constitute a phase-shifting circuit in which variation of the relative values of said pair of saturable reactors will vary the potential of a midpoint between said pair of reactors to make it approximate that at either end of the main reactor thereby changing the phase sequence of energization of said windings, conductors connecting the motor terminals to points of fixed potential in the network and to the midpoint of variable potential in the phase-shifting circuit, and means for controlling the phase-shifting circuit to vary the potential of said midpoint.

12. A control system for controlling the speed and the direction of rotation of an alternating-current motor energized from an alternating-current source, comprising an impedance network connected between the source and the motor and including a phase-shifting circuit provided with two saturable reactors to vary the potential of a midpoint between them, conductors connecting the motor terminals to the midpoint and to two other potential points of the network, a variable impedance in each conductor to the two other potential points, and means for varying the impedance values of said variable impedances.

13. A control system for controlling the speed and the direction of rotation of an alternating-current motor energized from an alternating-current source, comprising an impedance network connected between the source and the motor and including a phase-shifting circuit provided with two saturable reactors to vary the potential of a midpoint between them, conductors connecting the motor terminals to the midpoint and to two other potenial points of the network, a variable impedance in each conductor to the two other potential points, means for varying the impedance values of said variable impedances and means for controlling said varying means simultaneously with the adjustment of the phase-shifting circuit.

FINN H. GULLIKSEN.